(12) United States Patent
Kim

(10) Patent No.: US 11,466,807 B2
(45) Date of Patent: Oct. 11, 2022

(54) LOW TEMPERATURE PIPE INSULATION APPRATUS

(71) Applicant: DONG IN ENGINEERING CO., LTD., Gyeongju-si (KR)

(72) Inventor: Sang Ki Kim, Pohang-si (KR)

(73) Assignee: DONG IN ENGINEERING CO., LTD., Gyeongju-si (KR)

( * ) Notice: Subject to any disclaimer, the term of this patent is extended or adjusted under 35 U.S.C. 154(b) by 0 days.

(21) Appl. No.: 15/734,554

(22) PCT Filed: Oct. 16, 2019

(86) PCT No.: PCT/KR2019/013543
§ 371 (c)(1),
(2) Date: Dec. 2, 2020

(87) PCT Pub. No.: WO2020/256226
PCT Pub. Date: Dec. 24, 2020

(65) Prior Publication Data
US 2022/0228695 A1    Jul. 21, 2022

(30) Foreign Application Priority Data

Oct. 8, 2019  (KR) .......................... 10-2019-0124484

(51) Int. Cl.
*F16L 9/14*  (2006.01)
*F16L 59/02*  (2006.01)
*F16L 59/14*  (2006.01)

(52) U.S. Cl.
CPC ........... *F16L 59/029* (2013.01); *F16L 59/024* (2013.01); *F16L 59/141* (2013.01)

(58) Field of Classification Search
CPC ...... F16L 59/029; F16L 59/024; F16L 59/141
(Continued)

(56) References Cited

U.S. PATENT DOCUMENTS 2,129,680 A * 9/1938 Durant .................... F16L 59/14
249/99
2,857,931 A * 10/1958 Lawton .................... F16L 59/20
285/55
(Continued)

FOREIGN PATENT DOCUMENTS

JP         2005-133838      5/2005
KR    10-2007-0100207     10/2007
(Continued)

*Primary Examiner* — James F Hook
(74) *Attorney, Agent, or Firm* — Lex IP Meister, PLLC

(57) ABSTRACT

An insulation device for a low-temperature pipe according to the present disclosure includes: a pair of primary insulation materials surrounding a first radially outer surface and a second radially outer surface of the pipe; a pair of secondary insulation materials surrounding outer surfaces of the primary insulation materials; a pair of tertiary insulation materials surrounding outer surfaces of the secondary insulation materials; a pair of finishing covers surrounding outer surfaces of the tertiary insulation materials; an out-profile coupled to each of the finishing covers so as to surround each of widthwise opposite ends of the finishing cover; and an in-profile coupled to each of the finishing covers so as to surround each of lengthwise opposite ends of the finishing cover, wherein the pair of secondary insulation materials are configured such that each of opposed contact surfaces thereof is formed in a shape bent at least one time.

7 Claims, 15 Drawing Sheets

(58) Field of Classification Search
USPC .................................. 138/149, 161, 162, 169
See application file for complete search history.

(56) References Cited

U.S. PATENT DOCUMENTS

| | | | | |
|---|---|---|---|---|
| 3,677,303 | A * | 7/1972 | Martin | F16L 59/13 |
| | | | | 285/47 |
| 4,019,761 | A * | 4/1977 | Heidemann | C07D 223/22 |
| | | | | 285/47 |
| 4,162,093 | A * | 7/1979 | Sigmund | B29C 44/1295 |
| | | | | 285/97 |
| 4,182,379 | A * | 1/1980 | Lestak | F16L 59/166 |
| | | | | 138/123 |
| 4,287,245 | A * | 9/1981 | Kikuchi | F16L 59/024 |
| | | | | 428/317.5 |
| 4,509,561 | A * | 4/1985 | Litz | F16L 59/20 |
| | | | | 138/120 |
| 6,068,027 | A * | 5/2000 | Miller | F16L 1/24 |
| | | | | 138/140 |
| 6,983,768 | B1 | 1/2006 | Vujic | |
| 8,784,962 | B2 * | 7/2014 | Weidinger | B32B 5/02 |
| | | | | 138/143 |
| 2010/0294391 | A1 * | 11/2010 | Leclercq | C04B 35/536 |
| | | | | 156/154 |

FOREIGN PATENT DOCUMENTS

| | | |
|---|---|---|
| KR | 10-1820450 | 1/2018 |
| KR | 10-2018-0018190 | 2/2018 |

* cited by examiner

[FIG. 1]
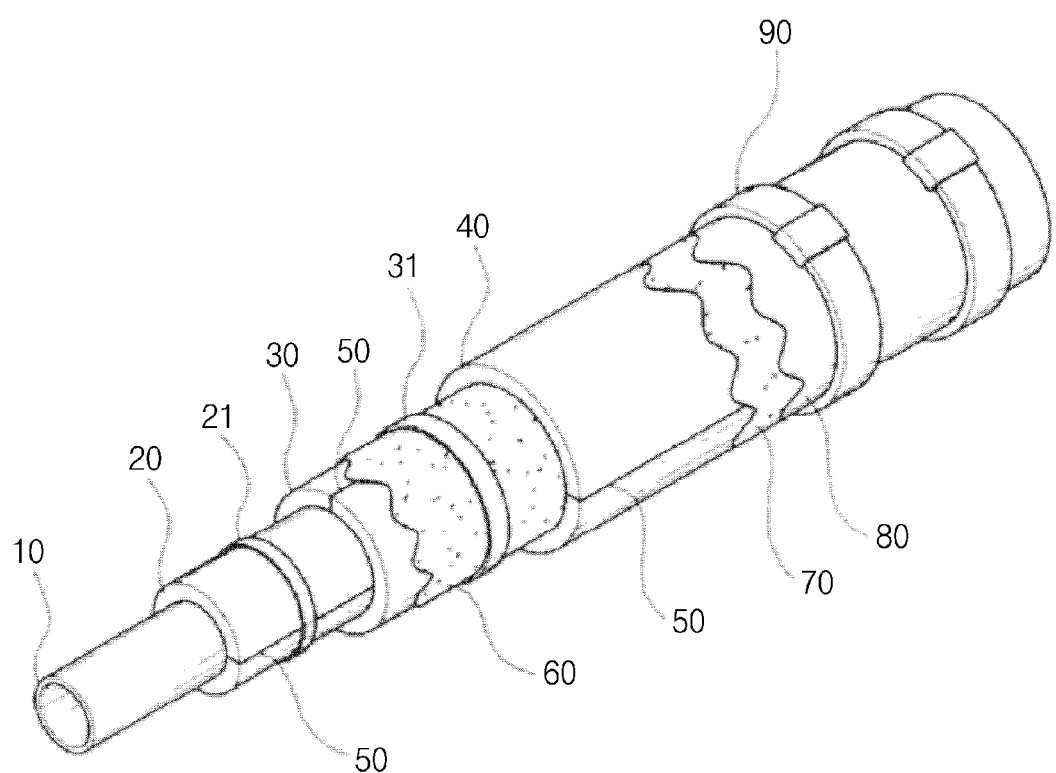

[FIG. 2]
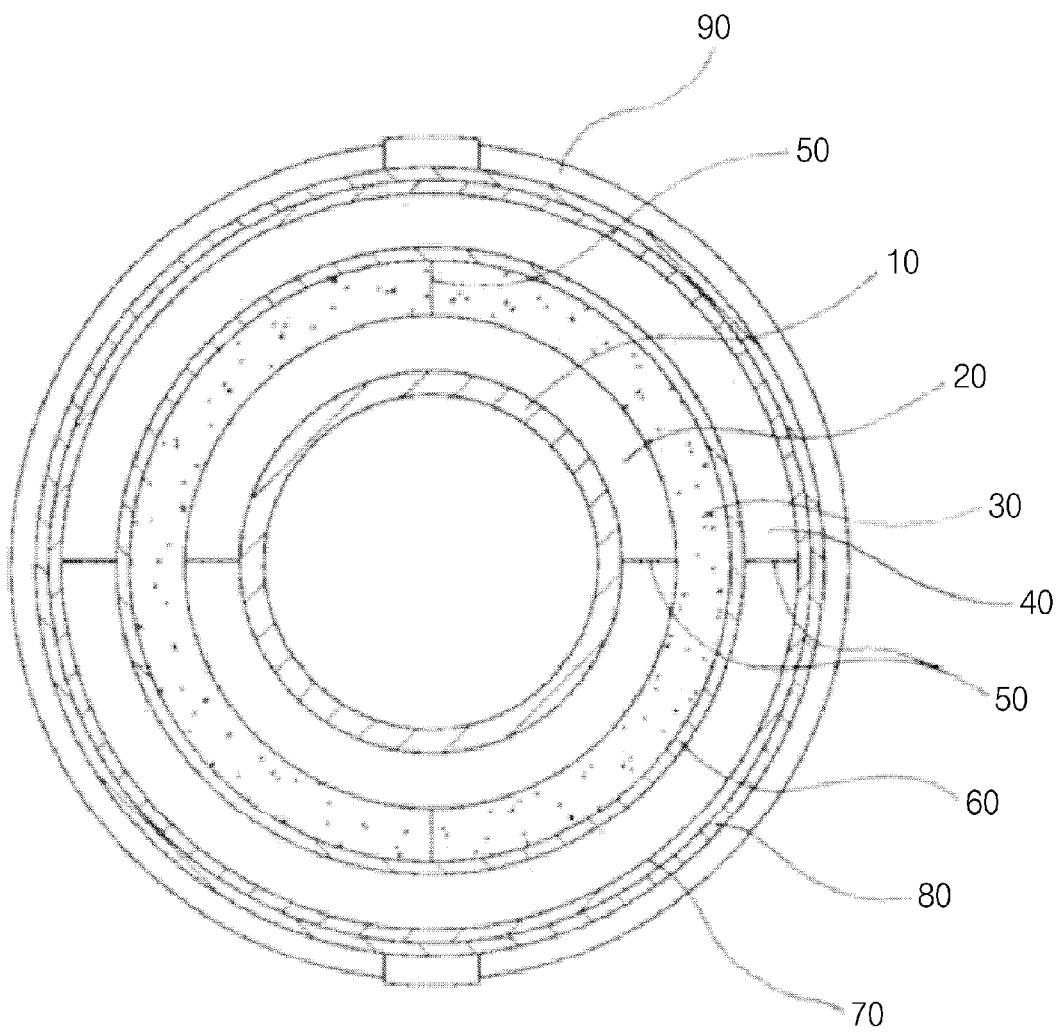

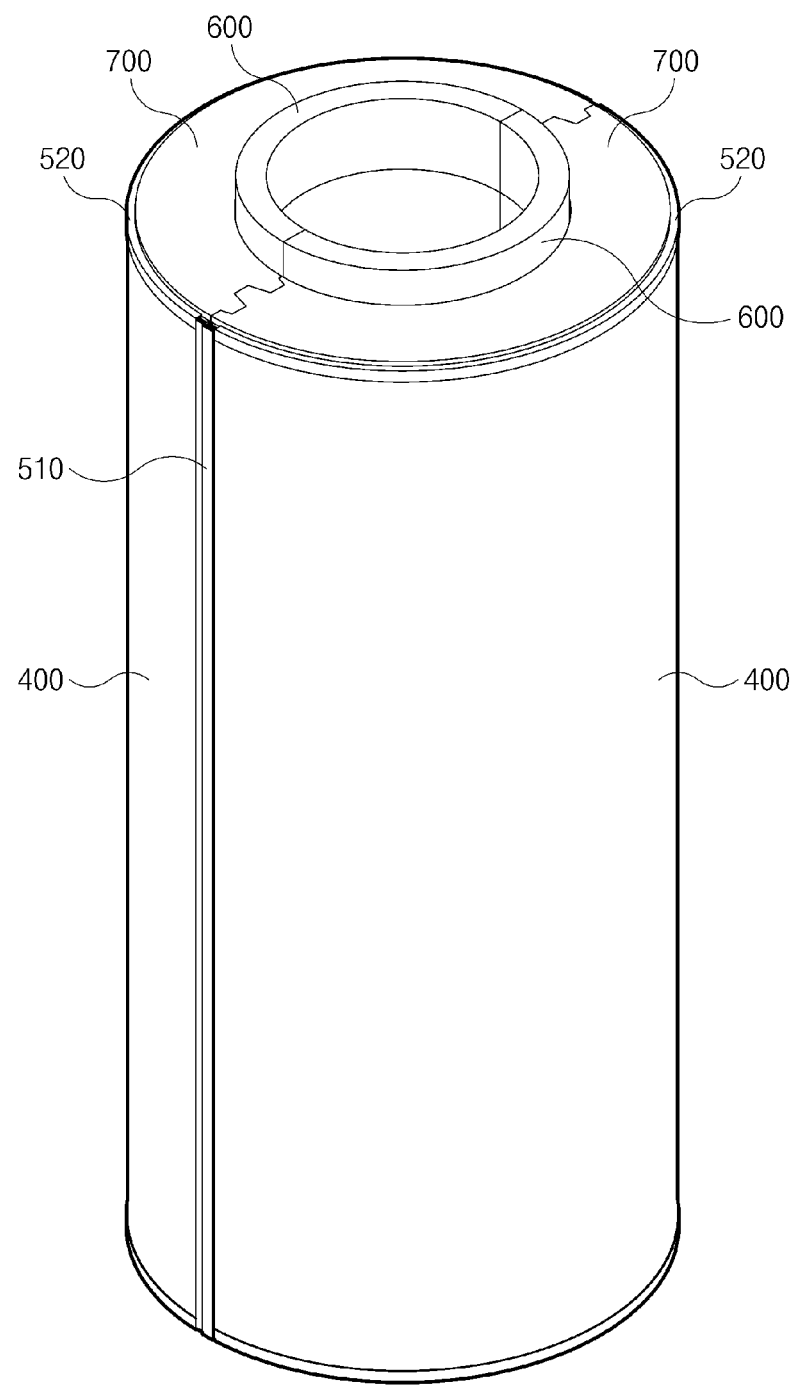
[FIG. 3]

[FIG. 4]
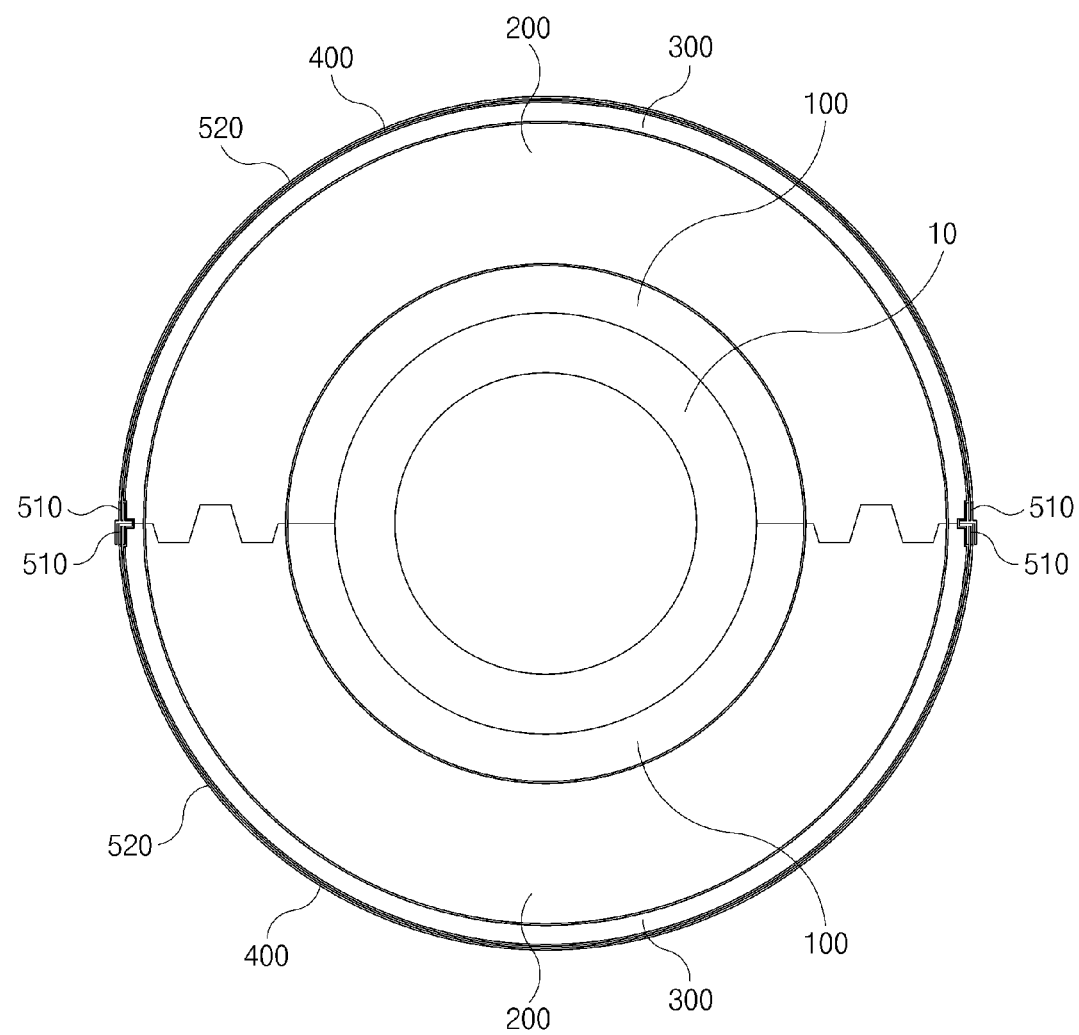

[FIG. 5]
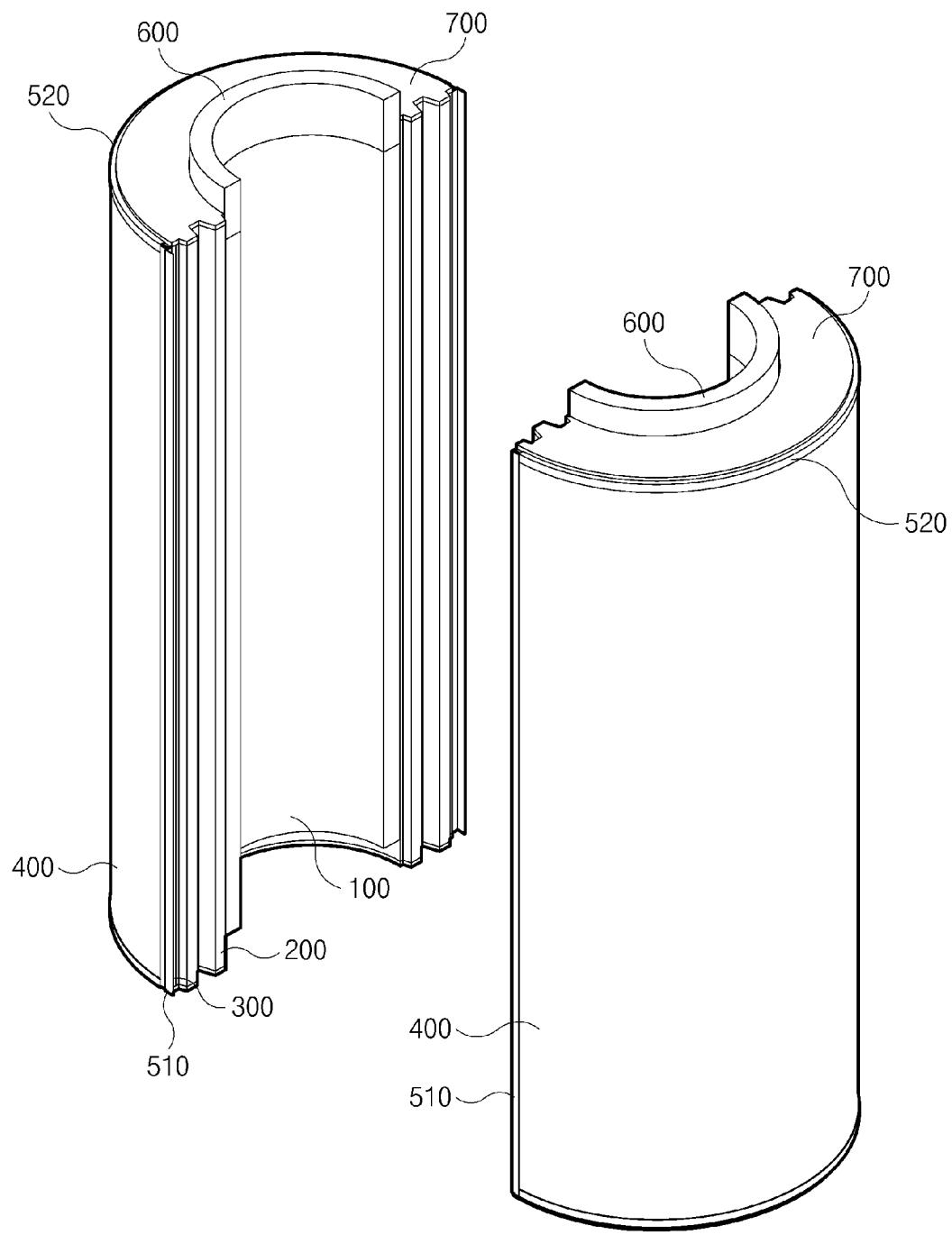

[FIG. 6]
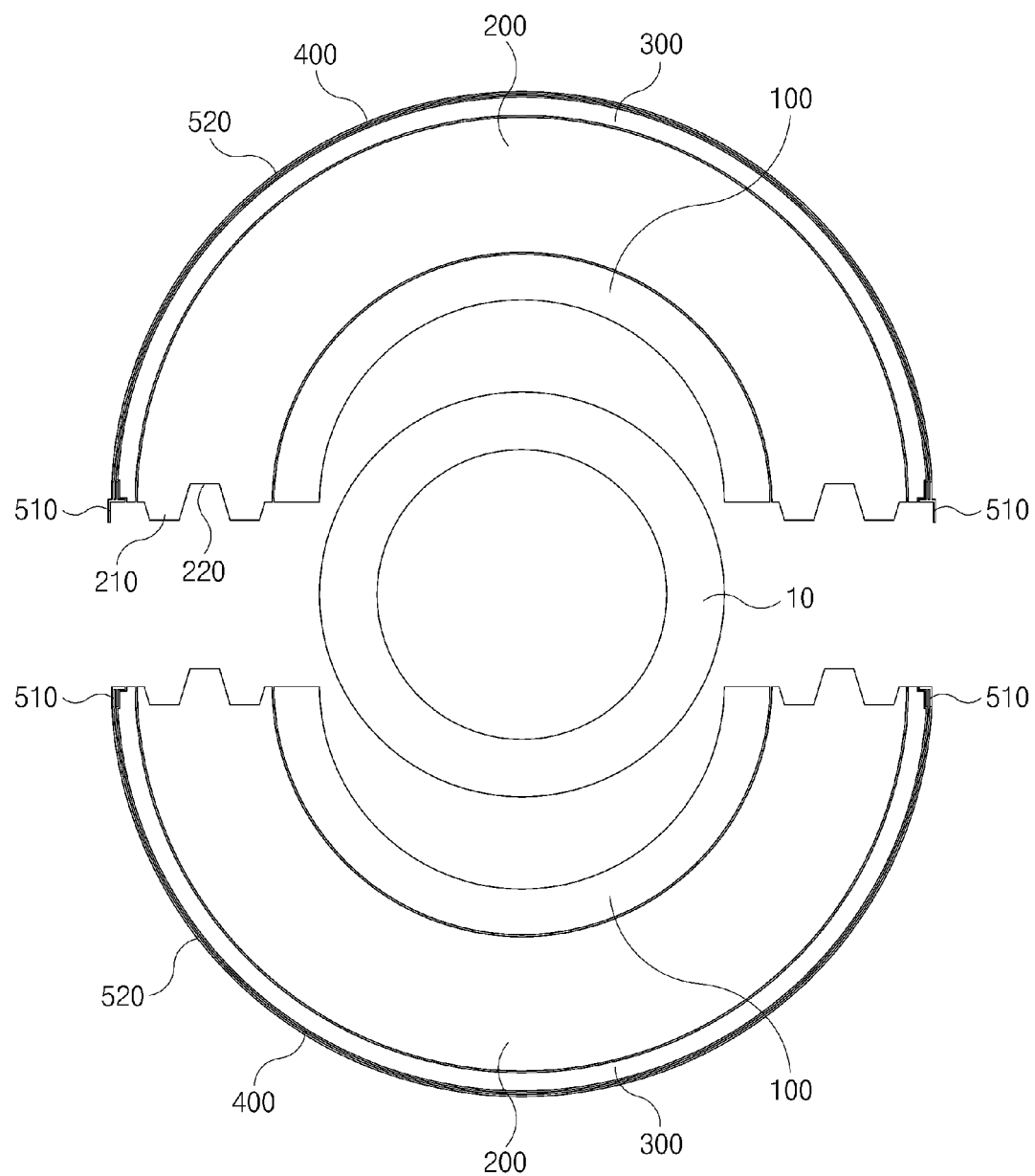

[FIG. 7]
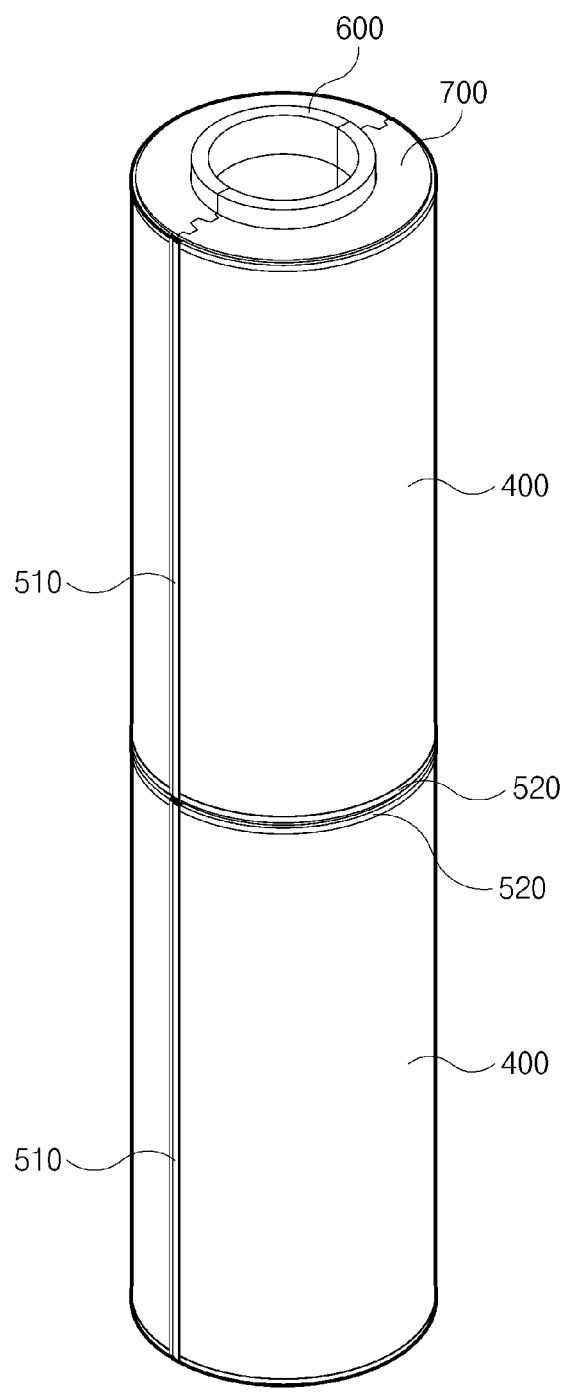

[FIG. 8]
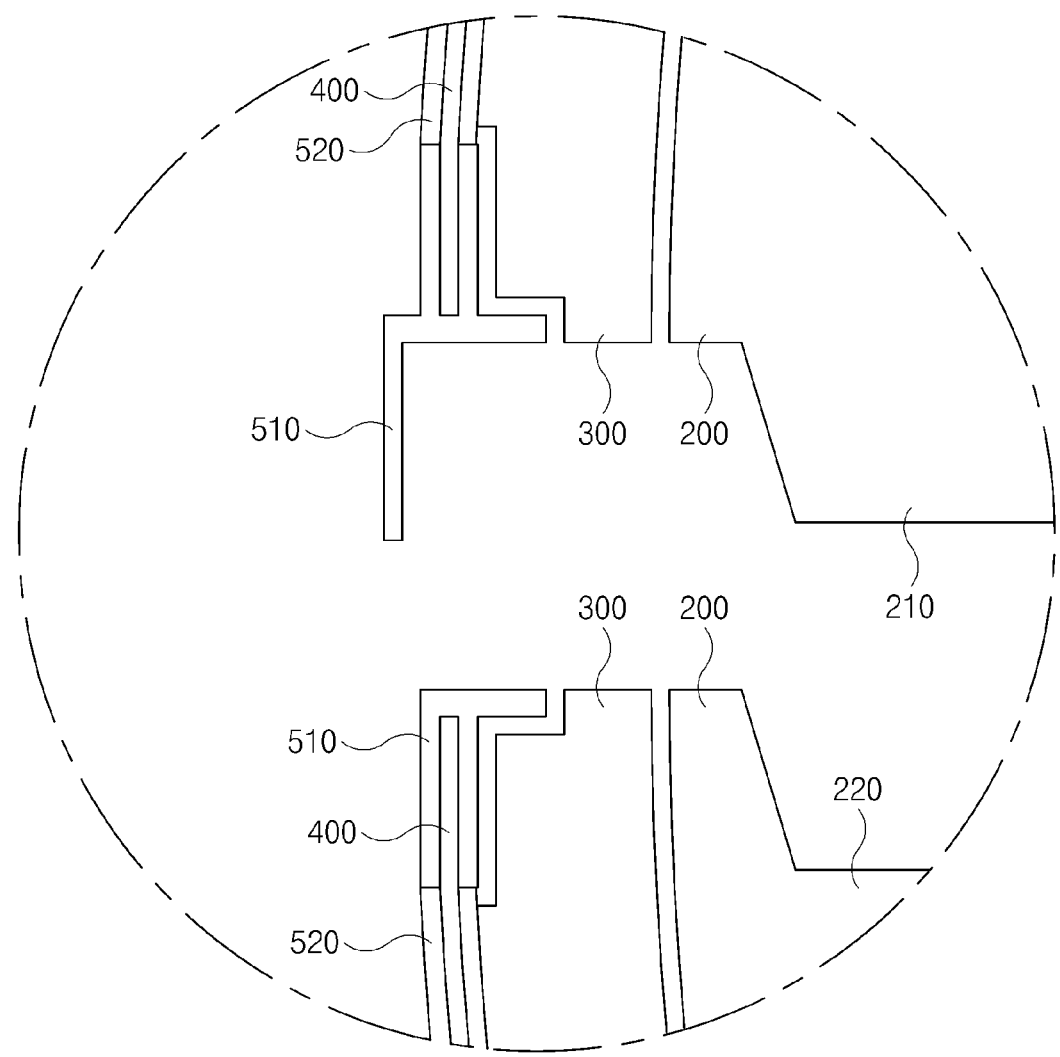

[FIG. 9]
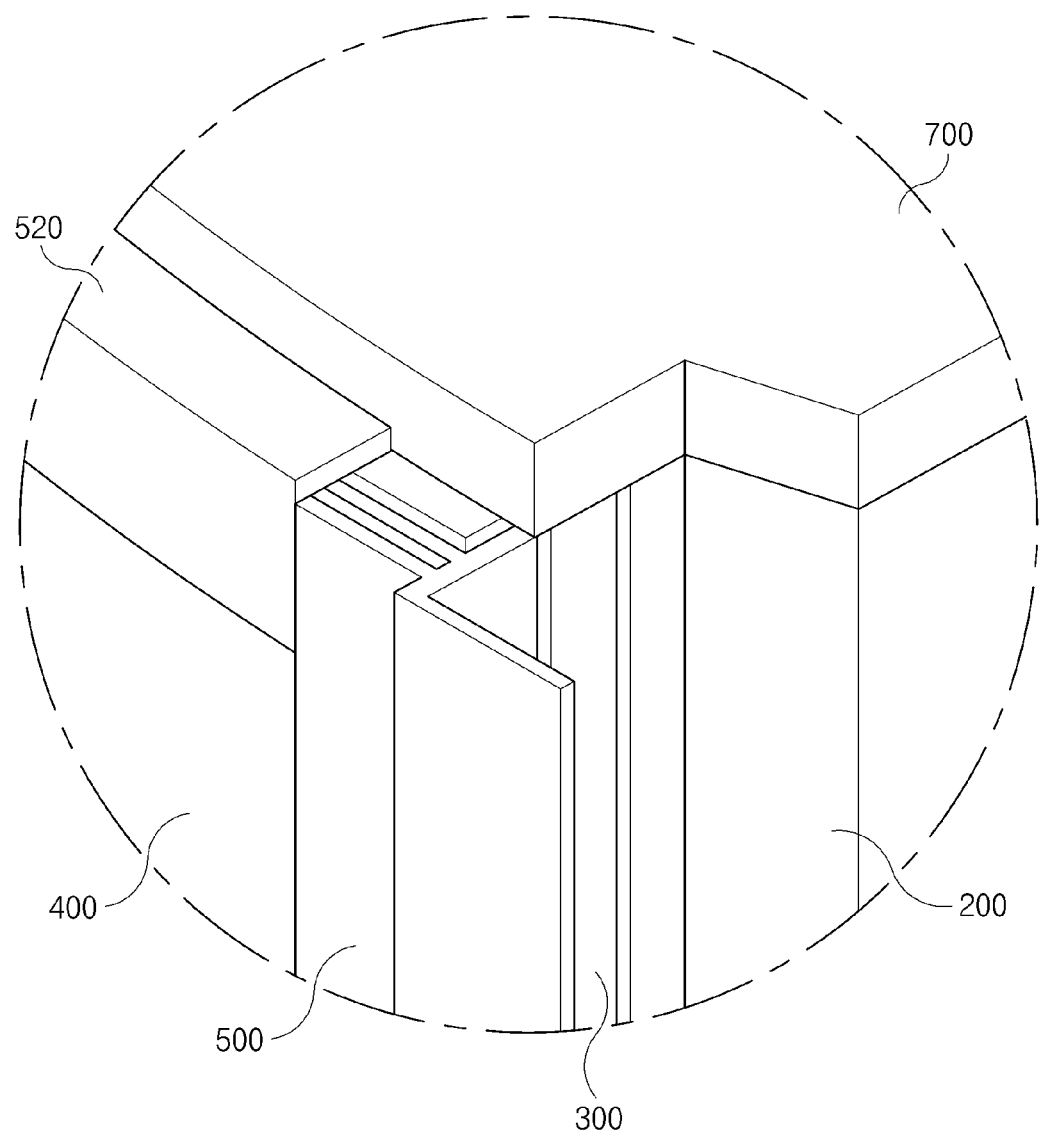

[FIG. 10]
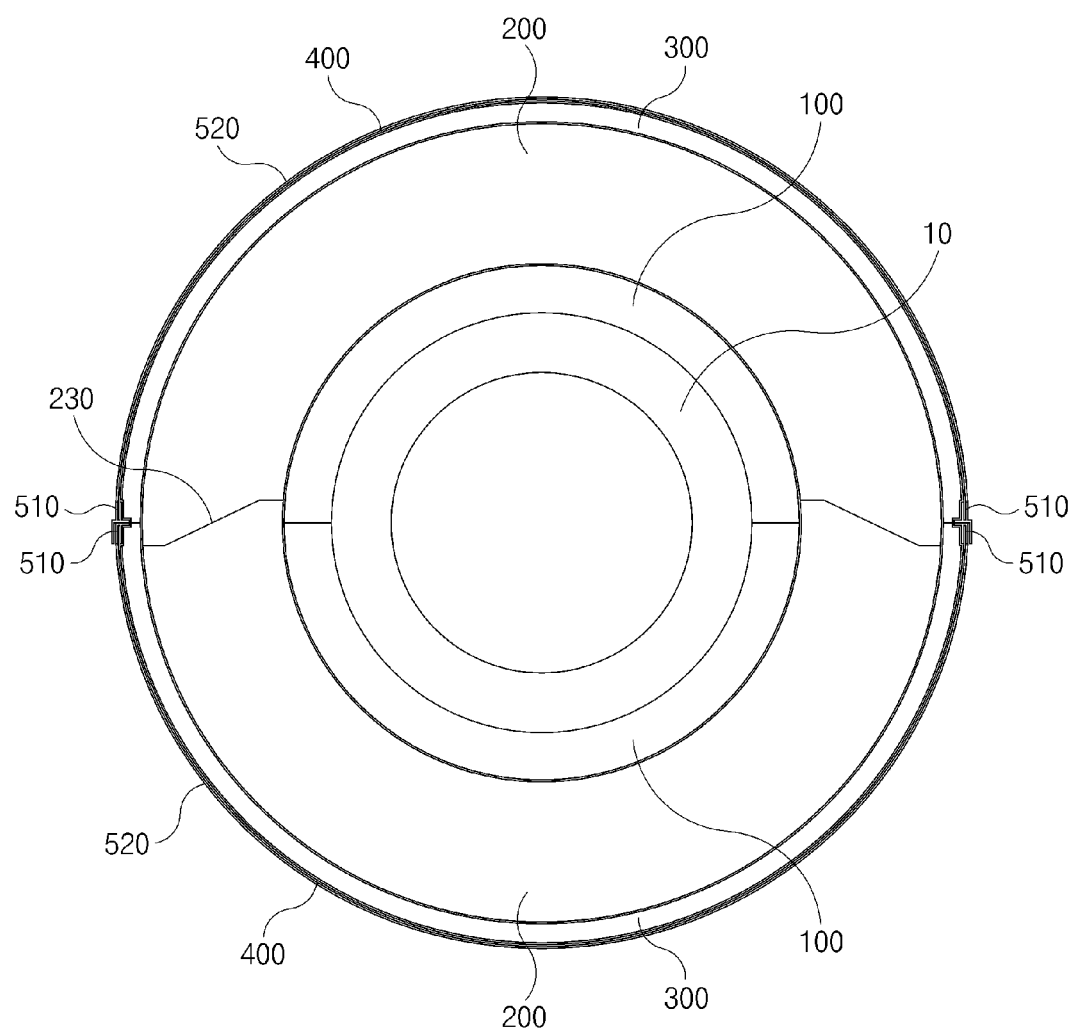

[FIG. 11]
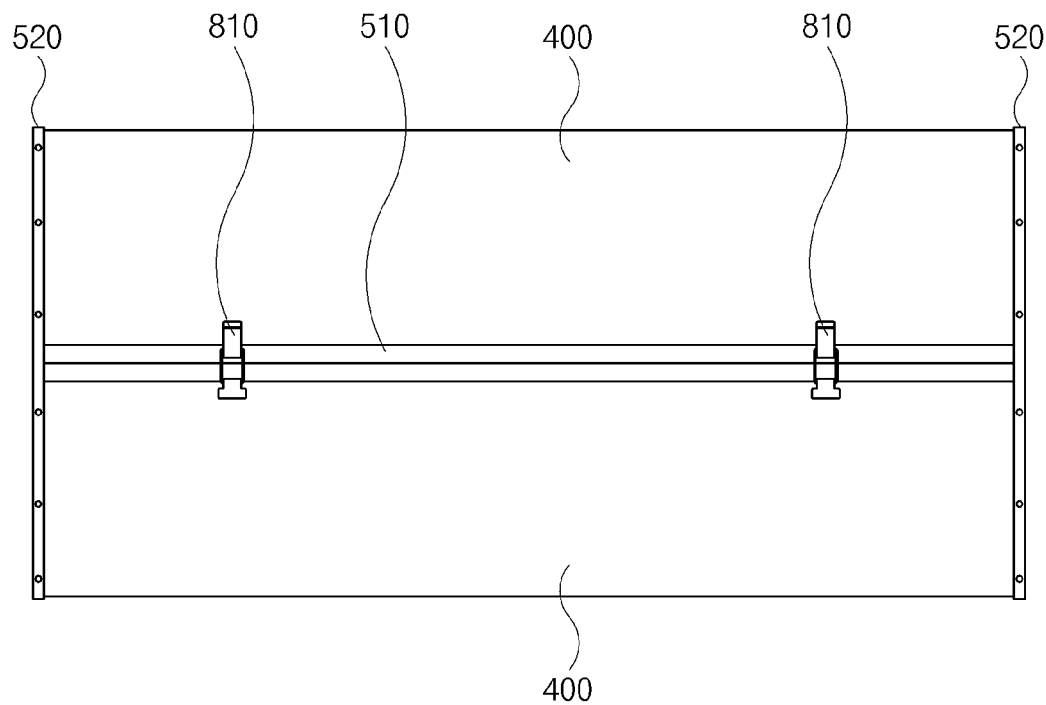

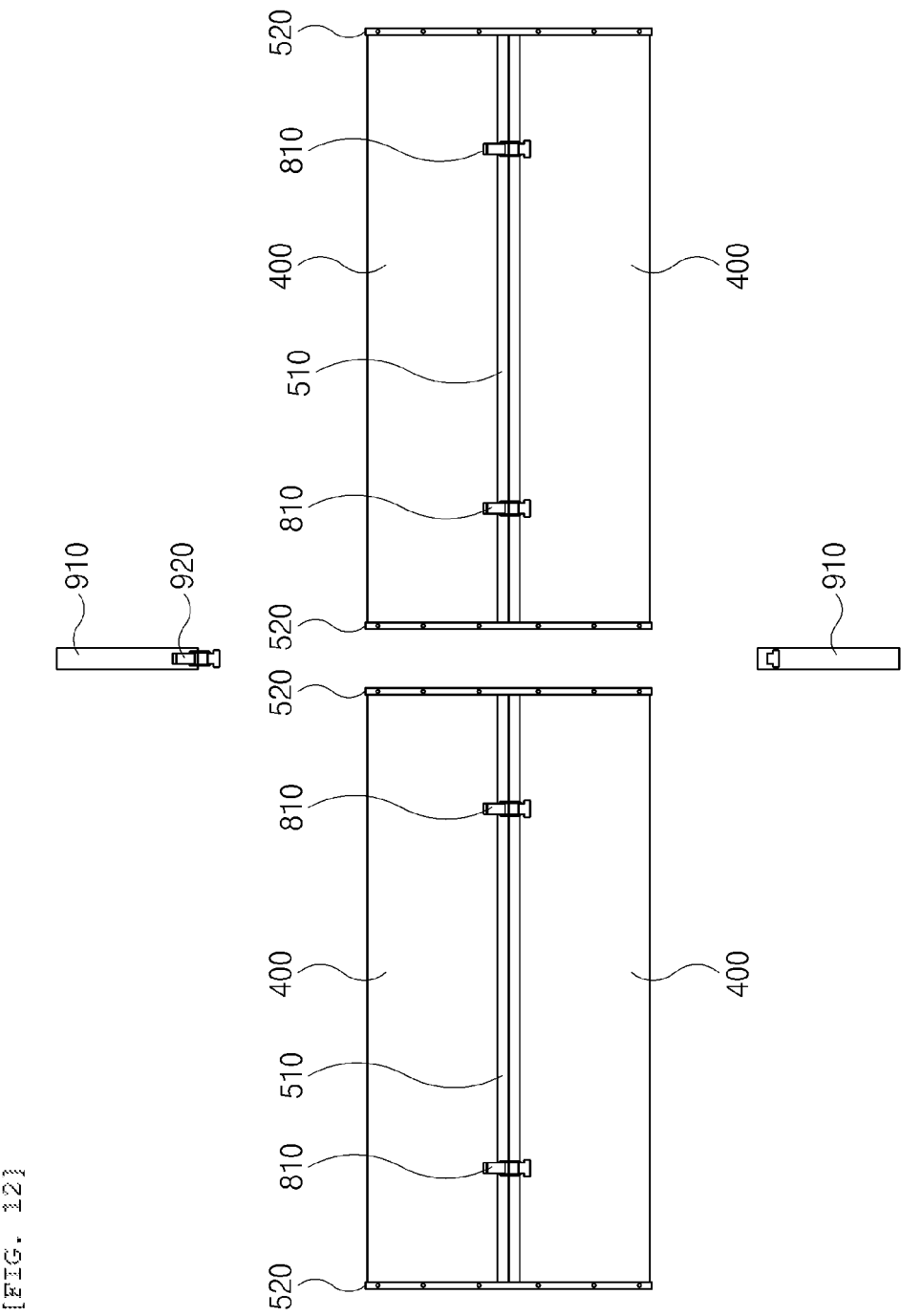
[FIG. 12]

[FIG. 13]
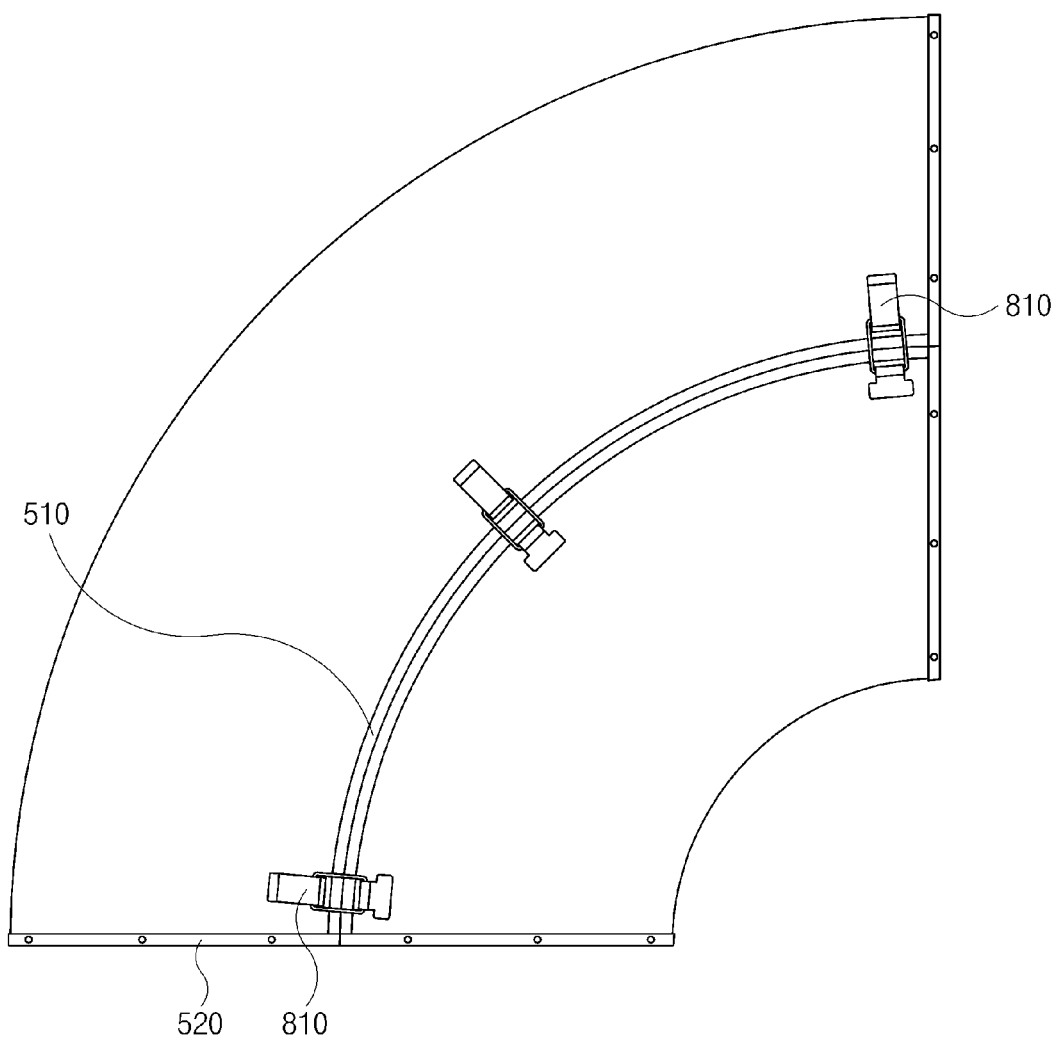

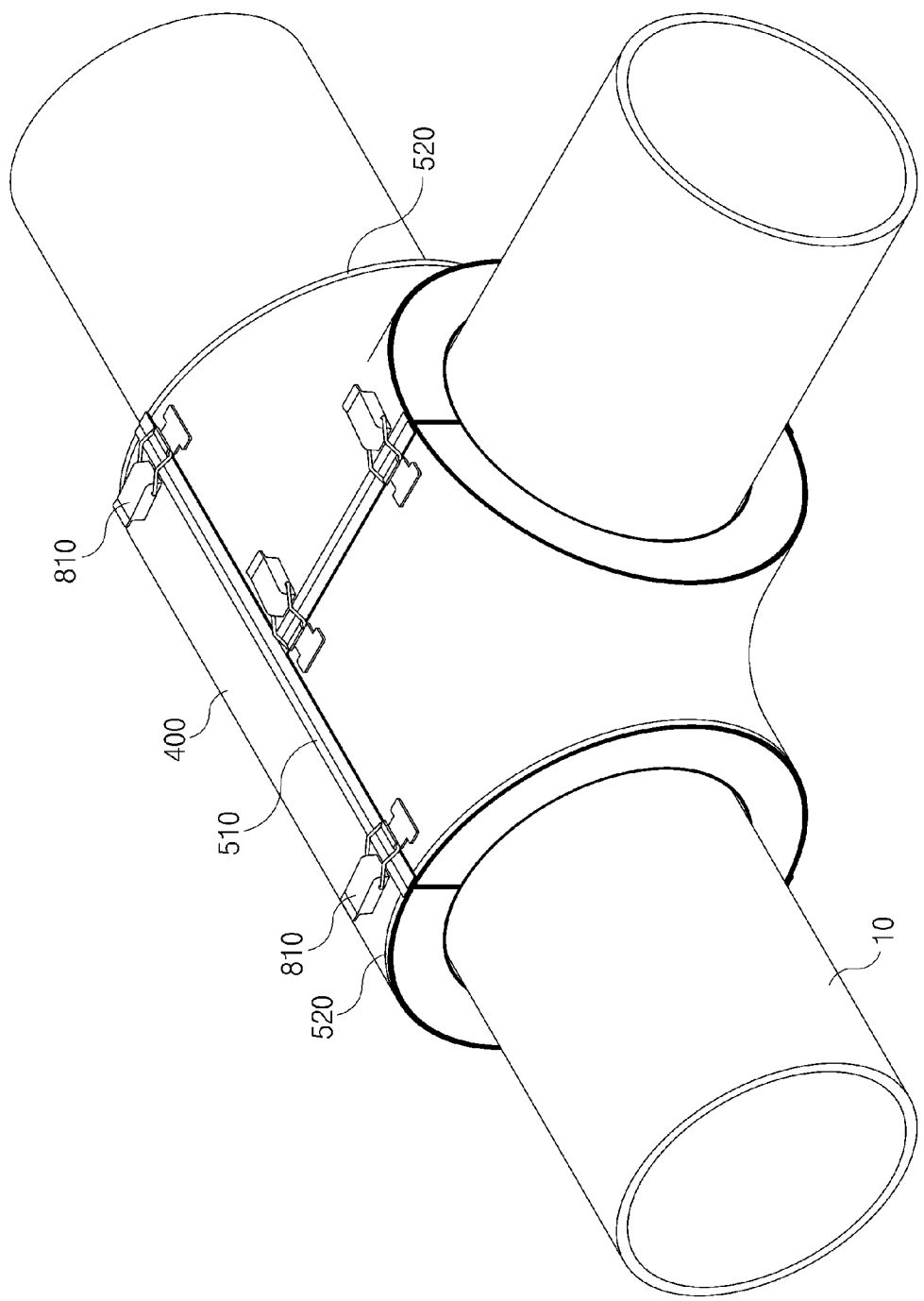
[FIG. 14]

[FIG. 15]
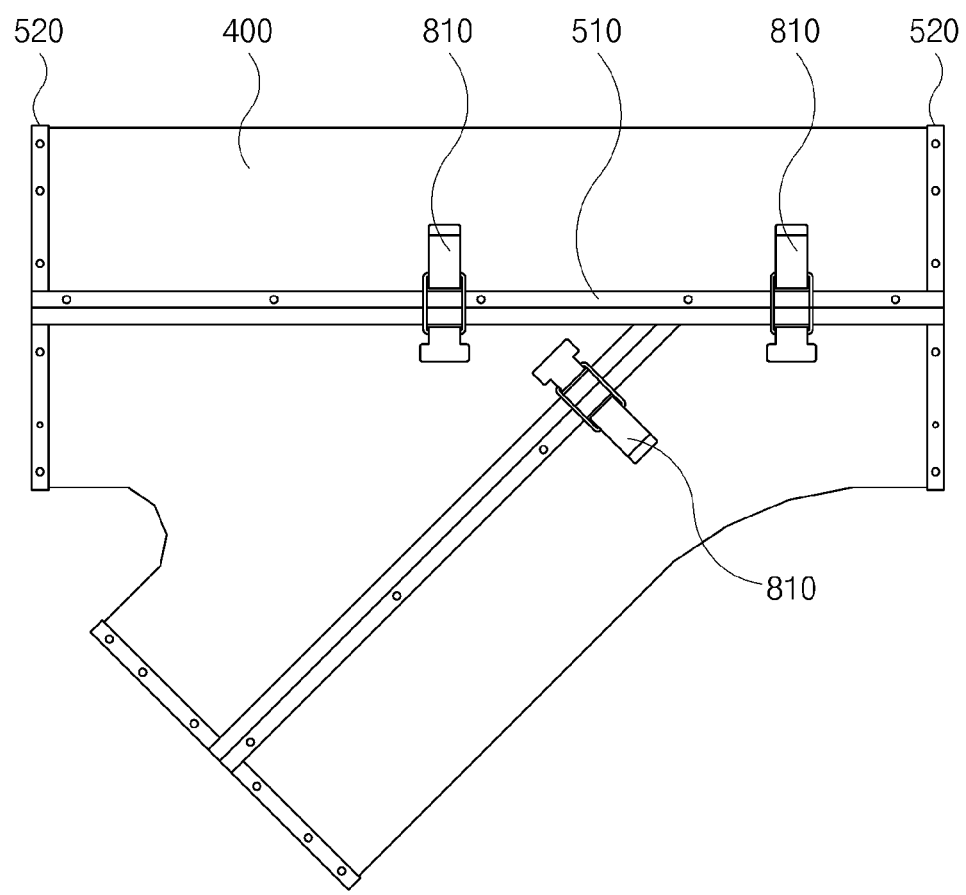

LOW TEMPERATURE PIPE INSULATION APPRATUS

TECHNICAL FIELD

The present disclosure relates generally to an insulation device for a low-temperature pipe to prevent the phenomenon that cold gas of a low-temperature pipe leaks out. More particularly, the present disclosure relates to an insulation device for a low-temperature pipe, the insulation device being configured so that even when a low-temperature pipe contracts due to cold gas, connection portions of the insulation device are prevented from being separated from portions connected thereto.

BACKGROUND ART

Liquefied gases such as liquefied natural gas (LNG), liquefied petroleum gas (LPG), and liquefied ethylene gas (LEG) are transported from ships to tanks at the storage base, stored, and then supplied to each consumption area through pipes in a supply line. In this case, the temperature of the liquefied gases transferred through the pipes is cryogenic. If the temperature thereof increases due to the temperature of ambient air during long-distance transfer, the liquefied gases may vaporize inside the pipes and thus may not be properly transferred. In addition, as the pressure inside the pipes increases, damage to the pipes may be caused, resulting in a fatal accident.

In view of this, an insulation device for a low-temperature pipe has been proposed to block ambient air by covering the pipe with an insulation material, and to prevent leakage of cold gas through the junction of the insulation material.

Hereinafter, the insulation device for the low-temperature pipe according to the related art will be described in detail with reference to the accompanying drawings.

FIGS. 1 and 2 are perspective and sectional views illustrating the insulation device for the low-temperature pipe according to the related art.

As illustrated in FIGS. 1 and 2, the insulation device for the low-temperature pipe according to the related art includes a pair of inner insulation materials 20 that are primarily coupled to an outer circumferential surface of a pipe 10 through which a low-temperature material is transferred, and a pair of intermediate insulation materials 30 and a pair of outer insulation materials 40 that are sequentially coupled on the inner insulation materials 20. Each of the pairs of inner, intermediate, and outer insulation materials 20, 30, and 40 is produced by forming a polyisocyanurate (hereinafter referred to as 'PIR') foam into two half (½)-cylindrical bodies and bonding the same with a sealant 50.

Glass fiber reinforcing tapes 21 and 31 are respectively wound on the inner insulation materials 20 and the intermediate insulation materials 30 to firmly support the same. In addition, in order to prevent moisture permeation, a manila paper is covered as a secondary vapor barrier film 60 on the intermediate insulation materials 30, and a mastic composed of about 30% of solids and 70% of volatile components is covered as a primary vapor barrier film 70 on the outer insulation materials 40. Then, a jacket layer 80 made of stainless steel or the like is applied as a metal protective film on the vapor barrier film 70, and finally a tape 90 made of stainless steel is wound on the jacket layer 80 by bending.

At this time, each of the pairs of inner, intermediate, and the outer insulation materials 20, 30, and 40, which are produced by bonding the half-cylindrical bodies, has junction lines formed by sealants 50. The areas where the junction lines are formed are characterized by being low in insulation properties compared to the areas where no junction lines are formed. Therefore, when the junction lines of the inner insulation materials 20, the junction lines of the intermediate insulation materials 30, and the junction lines of the outer insulation materials 30 are arranged in an aligned contact with each other, cold gas of the pipe 10 may easily leak out through the junction lines of each insulation material, which is problematic.

Meanwhile, in order to surround the long pipe 10 using the insulation device for the low-temperature pipe, a plurality of insulation devices for low-temperature pipes are required to be connected to each other in an aligned relationship in the lengthwise direction. In this case, the connection is performed under room temperature conditions, i.e., the insulation devices are assembled to the pipe under room temperature conditions. However, after the assembly is completed, when a low-temperature material of about −200° C. flows into the pipe, the pipe 10 contracts in the lengthwise direction. In this case, a gap may be generated between two insulation devices connected to each other in an aligned relationship, so that cold gas of the pipe 10 may easily leak out through the gap, which is problematic.

DISCLOSURE

Technical Problem

Accordingly, the present disclosure has been made keeping in mind the above problems occurring in the related art, and an objective of the present disclosure is to provide an insulation device for a low-temperature pipe, the insulation device being capable of reducing leakage of cold gas through a junction line surrounding a pipe, and of preventing a gap from being generated between insulation materials even when the pipe contracts due to a low-temperature material or expands upon removal of the low-temperature material.

Technical Solution

In order to accomplish the above objective, the present disclosure provides an insulation device for a low-temperature pipe, the insulation device including: a pair of primary insulation materials surrounding a first radially outer surface and a second radially outer surface of the pipe; a pair of secondary insulation materials surrounding outer surfaces of the primary insulation materials; a pair of tertiary insulation materials surrounding outer surfaces of the secondary insulation materials; a pair of finishing covers surrounding outer surfaces of the tertiary insulation materials; an out-profile coupled to each of the finishing covers so as to surround each of widthwise opposite ends of the finishing cover; and an in-profile coupled to each of the finishing covers so as to surround each of lengthwise opposite ends of the finishing cover, wherein the pair of secondary insulation materials may be configured such that each of opposed contact surfaces thereof is formed in a shape bent at least one time.

The pair of secondary insulation materials may be configured such that the opposed contact surfaces thereof have a protrusion and a recess engaged to each other.

The pair of secondary insulation materials may be configured such that each of the opposed contact surfaces thereof has an inclined surface intersecting a radial direction of the pipe.

The insulation device may further include a low-density foam insulation material made of a foam material having a lower density than that of the secondary insulation materials, and covering each of lengthwise opposite ends of each of the secondary insulation materials and tertiary insulation materials.

When the pipe contracts in a lengthwise direction, the low-density foam insulation material may expand in response thereto, and when the pipe expands in the lengthwise direction, the low-density foam insulation material may contract in response thereto.

Each of the primary insulation materials may be produced to have a shorter length than that of each of the secondary insulation materials, so that lengthwise opposite ends of the primary insulation material are located at positions inward from those of the secondary insulation material.

A high-density foam insulation material may be further provided, the high-density foam insulation material being in intimate contact with a lengthwise end of each of the primary insulation materials so as to cover a portion of the outer surfaces of the pipe that is not covered by the primary insulation material, and having a side protruding farther than an outer surface of the low-density foam insulation material.

When two neighboring primary insulation materials are arranged in an aligned relationship in a lengthwise direction, the high-density foam insulation material may be press-fitted between the two neighboring primary insulation materials so as to fill a gap therebetween.

The insulation device may further include: a semicircular connector ring into which two neighboring in-profiles in opposed contact with each other are inserted when two neighboring finishing covers are connected to each other in a lengthwise direction; and a connector clip connecting two connector rings arranged to form one circle.

Advantageous Effects

With the use of the insulation device for the low-temperature pipe according to the present disclosure, it is possible to reduce leakage of cold gas through a junction line of an insulation material surrounding the pipe, and to prevent a gap from being generated between two neighboring insulation materials even when the pipe contracts in the lengthwise direction due to cold gas.

DESCRIPTION OF DRAWINGS

FIGS. 1 and 2 are perspective and sectional views illustrating an insulation device for a low-temperature pipe according to the related art.

FIG. 3 is a perspective view illustrating an insulation device for a low-temperature pipe according to the present disclosure.

FIG. 4 is a sectional view illustrating the insulation device for the low-temperature pipe according to the present disclosure.

FIG. 5 is an exploded perspective view illustrating the insulation device for the low-temperature pipe according to the present disclosure.

FIG. 6 is an exploded sectional view illustrating the insulation device for the low-temperature pipe according to the present disclosure.

FIG. 7 is a perspective view illustrating a shape in which two insulation devices for low-temperature pipes according to the present disclosure are coupled to each other in an aligned relationship.

FIG. 8 is an enlarged view illustrating coupling structures of an out-profile and an in-profile included in the insulation device for the low-temperature pipe according to the present disclosure.

FIG. 9 is an enlarged view illustrating a coupling structure of a low-density foam insulation material included in the insulation device for the low-temperature pipe according to the present disclosure.

FIG. 10 is a sectional view illustrating a second embodiment of an insulation device for a low-temperature pipe according to the present disclosure.

FIG. 11 is a side view illustrating the insulation device for the low-temperature pipe according to the present disclosure.

FIG. 12 is a view illustrating a use state of the insulation device for the low-temperature pipe according to the present disclosure.

FIGS. 13 to 15 are views illustrating another embodiment of an insulation device for a low-temperature pipe according to the present disclosure.

MODE FOR INVENTION

Hereinafter, embodiments of an insulation device for a low-temperature pipe according to the present disclosure will be described in detail with reference to the accompanying drawings.

FIG. 3 is a perspective view illustrating an insulation device for a low-temperature pipe according to the present disclosure, FIG. 4 is a sectional view illustrating the insulation device for the low-temperature pipe according to the present disclosure, FIG. 5 is an exploded perspective view illustrating the insulation device for the low-temperature pipe according to the present disclosure, and FIG. 6 is an exploded sectional view illustrating the insulation device for the low-temperature pipe according to the present disclosure.

The insulation device for the low-temperature pipe according to the present disclosure is a device for preventing the phenomenon that cold gas of the a pipe 10 is leaked out by surrounding an outer surface of the pipe 10 for transporting a fluid having a cryogenic temperature, and is characterized by being configured to prevent the phenomenon that cold gas from leaking out through a junction line of an insulation material surrounding the pipe 10.

That is, the insulation device for the low-temperature pipe according to the present disclosure is characterized by including a pair of primary insulation materials 100 surrounding a first radially outer surface and a second radially outer surface of the pipe 10, a pair of secondary insulation materials 200 surrounding outer surfaces of the primary insulation materials 100, a pair of tertiary insulation materials 300 surrounding outer surfaces of the secondary insulation materials 200, a pair of finishing covers 400 surrounding outer surfaces of the tertiary insulation materials 300, an out-profile coupled to each of the finishing covers 400 so as to surround each of widthwise opposite ends of the finishing cover 400, and an in-profile coupled to each of the finishing covers 400 so as to surround each of lengthwise opposite ends of the finishing cover 400, wherein the pair of secondary insulation materials 200 are configured such that each of opposed contact surfaces thereof is formed in a shape bent at least one time.

The primary insulation materials 100 are made of an insulation material having insulation performance and high elasticity, and serve to prevent leakage of cold gas from the pipe 10 by being in intimate contact with the outer surfaces of the pipe 10 so that no gap is generated. The primary insulation materials 100 may be high-density foam rubber insulation materials.

The secondary insulation materials 200 are made of an insulation material having very low elasticity but excellent insulation performance, and are produced to be very thick compared to the primary insulation materials 100. At this time, the pair of secondary insulation materials 200 are coupled to each other so that respective widthwise opposite ends thereof are in opposed contact with each other. However, when each of the secondary insulation materials 200 is produced so that each of opposed contact surfaces thereof forms one planar surface, there is a problem in that cold gas may easily leak out through the contact surfaces. In the insulation device for the low-temperature pipe according to the present disclosure, the secondary insulation materials 200 are characterized in that each of widthwise end surfaces thereof does not form one planar surface, but forms a shape that is bent a plurality of times, i.e., each of opposed end surfaces thereof has a protrusion 210 and a recess 220, and the protrusion 210 and the recess 220 of one end surface are engaged to the recess 220 and the protrusion 210 of an opposed end surface.

As such, in a case where the protrusion 210 and the recess 220 are formed on the widthwise end surface of the secondary insulation material 200, when the pair of the secondary insulation materials 200 are coupled to each other to form one cylinder as illustrated in FIG. 4, each junction line between the opposed contact surfaces is bent to form a pulse wave shape. Thus, there is an advantage in that it is possible to significantly reduce the phenomenon that cold gas of the pipe 10 leaks out through junction lines of the pair of secondary insulation materials 200.

In addition, through the protrusion 210 and the recess 220 formed on the widthwise end surface of the secondary insulation material 200, even when junction surfaces of the pair of the primary insulation materials 100, junction surfaces of the pair of secondary insulation materials 200, and junction surfaces of the tertiary insulation materials 300 are not arranged in a misaligned relationship, it is possible to prevent leakage of cold gas from the pipe 10. Thus, there is an advantage in that each of the insulation materials 100, 200, and 300 is easy to assemble. The secondary insulation materials (200) may be made of expanded polystyrene (EPS) or expanded polypropylene (EPP).

Meanwhile, the tertiary insulation materials 300 are components that are inserted between the secondary insulation materials 200 and the finishing covers 400 so as not to generate a gap therebetween, and are preferably made of an insulation material having low density and high elasticity. The tertiary insulation materials 300 fill a gap between the secondary insulation materials 200 having relatively weak elasticity and the finishing covers 400 so as to prevent an empty gap from being generated between the secondary insulation materials 200 and the finishing covers 400 while maintaining a separation distance therebetween, thereby preventing leakage of cold gas.

The finishing covers 400 are made of a metal material such as aluminum, and are provided in a shape conforming to the shape of a pipe.

When two insulation devices for low-temperature pipes according to the present disclosure are coupled to each other in the lengthwise direction, in order to prevent cold gas from leaking between the two insulation devices for the low-temperature pipes, a high-density foam insulation material 600 and a low-density foam insulation material 700 are provided at an lengthwise end of each of the insulation materials 100, 200, and 300.

FIG. 7 is a perspective view illustrating a shape in which two insulation devices for low-temperature pipes according to the present disclosure are coupled to each other in an aligned relationship, FIG. 8 is an enlarged view illustrating coupling structures of an out-profile and an in-profile included in the insulation device for the low-temperature pipe according to the present disclosure, and FIG. 9 is an enlarged view illustrating a coupling structure of the low-density foam insulation material 700 included in the insulation device for the low-temperature pipe according to the present disclosure.

Since the insulation device for the low-temperature pipe according to the present disclosure is mounted so as to surround the pipe 10 for transporting a fluid having a cryogenic temperature, each of the insulation materials 100, 200, and 300 may contract in response to cold gas delivered from the pipe 10. Therefore, as illustrated in FIG. 7, when the respective insulation materials 100, 200, and 300 contract in the lengthwise direction in a state in which the two insulation devices for the low-temperature pipes are coupled to each other in an aligned relationship, gaps are generated between neighboring insulation materials arranged in an aligned relationship, causing a serious problem in that the cold gas of the pipe 10 may leak out through such gaps.

In order to solve this problem, the insulation device for the low-temperature pipe according to the present disclosure further includes the low-density foam insulation material 700 that is made of a foam material having a lower density than that of the secondary insulation materials 200 and covers each of lengthwise opposite ends of each of the secondary insulation materials 200 and tertiary insulation materials 300 (see FIG. 9).

The low-density foam insulation material 700 is made of an insulation material having low density and high elasticity, and is mounted between two neighboring secondary insulation materials 200 that are arranged in an aligned relationship in the lengthwise direction.

In general, the insulation device for the low-temperature pipe is installed on the pipe 10 in a state in which a low-temperature material is not accommodated in the pipe 10 for the purpose of protection of an installer. After the installation is completed, when a material having a cryogenic temperature of −150 to −200° C. is accommodated in the pipe 10 and flows therethrough, the pipe 10 contracts in the lengthwise direction. While the pipe 10 contracts, the secondary insulation materials 200 do not contract or contract less. Therefore, when the low-density foam insulation material 700 does not exist, there is a problem in that a gap may be generated in a lengthwise junction between two neighboring secondary insulation materials 200 and between two neighboring tertiary insulation materials 300 due to the contraction of the pipe 100, and cold gas may leak out through the gap.

The low-density foam insulation material 700 is to overcome this problem. When the pipe 10 contracts in the lengthwise direction, the low-density foam insulation material 700 contracts in response thereto, and when the pipe 10 expands in the lengthwise direction, the low-density foam insulation material 700 expands (or restores) in response thereto. Therefore, there is an advantage in that no gap is generated between the two neighboring secondary insulation materials 200 arranged in an aligned relationship in the lengthwise direction and between the two neighboring tertiary insulation materials 300 arranged in an aligned relationship in the lengthwise direction, i.e., cold gas of the pipe 10 is prevented from leaking out.

At this time, the low-density foam insulation material 700 may be made of any material as long as it has insulation properties of equal to or greater than a predetermined level, but has an elastic restoring force so that it can be restored to its original state when a pressing force applied externally is released.

In addition, when the lengthwise end of each of the primary insulation materials 100, the lengthwise end of each of the secondary insulation materials 200, and the lengthwise end of each of the tertiary insulation materials 300 are coaxially aligned with each other, there is a problem in that cold gas of the pipe 10 may easily leak out through the lengthwise end of each insulation material.

In order to solve this problem, the insulation device for the low-temperature pipe according to the present disclosure may be configured so that each of the primary insulation materials 100 is produced to have a shorter length than that of each of the secondary insulation materials 200, so that lengthwise opposite ends of the primary insulation material 100 are located at positions inward from those of the secondary insulation material 200. At this time, as mentioned above, in a case where the primary insulation materials 100 are produced short, as illustrated in FIG. 7, when the two insulation devices for the low-temperature pipes are coupled to each other in an aligned relationship in the lengthwise direction, an empty gap may be generated between ends of two neighboring primary insulation materials 100 arranged in an aligned relationship in the lengthwise direction the ends of the vehicle insulation 100, so that cold gas may easily leak out through the empty gap.

Therefore, as illustrated in FIG. 5, the insulation device for the low-temperature pipe according to the present disclosure may further include the high-density foam insulation material 600 that is in intimate contact with a lengthwise end of each of the primary insulation materials 100 so as to cover a portion of the outer surfaces of the pipe 10 that is not covered by the primary insulation material 100, and that has a side protruding farther than an outer surface of the low-density foam insulation material 700.

In a case where the high-density foam insulation material 600 is additionally provided as described above, when the two neighboring primary insulation materials 100 are arranged in an aligned relationship in the lengthwise direction, the gap between the two neighboring primary insulation materials 100 is filled by the high-density foam insulation material 600. Therefore, there is an advantage in that it is possible to effectively prevent leakage of cold gas from the pipe 10.

In addition, the high-density foam insulation material 600 is mounted so that an outer end thereof protrudes outward from an outer surface of the low-density foam insulation material 700. Therefore, when the two insulation devices for the low-temperature pipes are coupled to each other in an aligned arrangement, an end of a high-density foam insulation material 600 of the insulation device for the low-temperature pipe located at a lower position is inserted into the insulation device for the low-temperature pipe located at an upper position. When the high-density foam insulation material 600 of the insulation device of the low-temperature pipe located at the lower position is inserted into the insulation device for the low-temperature pipe located at the upper position, there is an advantage in that even when a horizontal external force is applied in the state illustrated in FIG. 7, the two insulation devices for the low-temperature pipes are prevented from being separated from each other unless the high-density foam insulation material 600 is fractured.

The high-density foam insulation material 600 may be made of the same material as that of the primary insulation materials 100.

Meanwhile, the out-profile is mounted so that each of the widthwise opposite ends of each of the finishing covers 400 is inserted into the out-profile in a fitting manner, and the in-profile is mounted so that each of the lengthwise opposite ends of each of the finishing covers 400 is inserted into the in-profile in a fitting manner (see FIG. 8). These out-profile and in-profile are known in the art to which the present disclosure belongs, and thus, detailed descriptions of the shapes and coupling structures of the out-profile and the in-profile will be omitted.

FIG. 10 is a sectional view illustrating a second embodiment of an insulation device for a low-temperature pipe according to the present disclosure.

A pair of secondary insulation materials 200 coupled to each other to form one cylinder may be produced so that opposed contact surfaces thereof form a pulse wave shape as illustrated in FIGS. 4 and 6, or form a stepped shape.

For example, as illustrated in FIG. 10, the pair of secondary insulation materials 200 may be configured such that each of the opposed contact surfaces thereof has an inclined surface 230 intersecting the radial direction of the pipe 10.

As such, in a case where the opposed contact surfaces of the pair of secondary insulation materials 200 form a stepped shape, it is possible to reduce the phenomenon that cold gas of the pipe 10 leaks out through junction lines of the secondary insulation materials 200. In addition, there is an advantage in that manufacturing thereof is easy compared to the embodiment illustrated in FIGS. 4 and 6. Of course, even in the case where the opposed contact surfaces of the pair of secondary insulation materials 200 form a stepped shape, the opposed contact surfaces are required to be completely in intimate contact without any gaps.

Meanwhile, in this embodiment, although it only a case where only one inclined surface 230 is provided on each of the opposed contact surfaces of the pair of secondary insulation materials 200 is illustrated, the number and angle of the inclined surface 230 may vary depending on the designer's selection.

FIG. 11 is a side view illustrating the insulation device for the low-temperature pipe according to the present disclosure, and FIG. 12 is a view illustrating a use state of the insulation device for the low-temperature pipe according to the present disclosure.

The insulation device for the low-temperature pipe according to the present disclosure may include a fastening means 810 for coupling each of the widthwise opposite ends of one of the pair of finishing covers 400 and an associated one of the widthwise opposite ends of a remaining one of the pair of finishing covers 400 so that the pair of finishing covers 400 are coupled to each other to form one cylinder. In this embodiment, although only a case where the fastening means 810 is a clip having a hook it is illustrated, the fastening means 810 may be replaced with various structures.

In addition, the insulation device for the low-temperature pipe may further include: a semicircular connector ring 910 into which two neighboring in-profiles in opposed contact with each other are inserted so that a plurality of insulation devices for low-temperature pipes are coupled to each other in an aligned relationship in the lengthwise direction of the pipe 10, i.e., so that when two neighboring finishing covers 400 are connected to each other in the lengthwise direction, the two neighboring finishing covers 400 are coupled to each other; and a connector clip 920 for connecting two connector rings 910 arranged to form one circle.

The two connector rings 910 are separated in a semicircular shape and are coupled by the separate connector clip 920. This connector clip 920 is widely commercialized in the technical field to which the present disclosure belongs, and thus, a detailed description of a process in which the two connector rings 910 are separated into two semicircular rings or coupled to each other to form one ring by the connector clip 920 will be omitted.

FIGS. 13 to 15 are views illustrating another embodiment of an insulation device for a low-temperature pipe according to the present disclosure.

The insulation device for the low-temperature pipe according to the present disclosure may be configured in a structure surrounding a straight pipe as illustrated in FIGS. 2 to 12, and may be changed in shape to a structure surrounding various types of pipes 10, such as an elbow pipe, a T-pipe, a Y-branch pipe, and the like.

For example, the insulation device for the low-temperature pipe according to the present disclosure may be changed in shape to a structure surrounding an elbow pipe that is bent at an angle of 90 degrees as illustrated in FIG. 13, or a structure surrounding a T-pipe as illustrated in FIG. 14, or a structure surrounding a Y-branch pipe as illustrated in FIG. 15.

Furthermore, the insulation device for the low-temperature pipe according to the present disclosure may be changed in shape to a structure capable of surrounding parts for connection of the pipe 10, such as a reducer, a valve, a flange, and the like.

While exemplary embodiments of the present disclosure have been described in detail as above, the scope of the present disclosure should be determined on the basis of the descriptions in the appended claims, not any specific embodiment, and all equivalents thereof should belong to the scope of the present disclosure. In addition, those skilled in the art will appreciate that various modifications, additions and substitutions are possible, without departing from the scope and spirit of the present disclosure as disclosed in the appended claims.

The invention claimed is:

1. An insulation device for a low-temperature pipe, the insulation device comprising:
    a pair of primary insulation materials surrounding a first radially outer surface and a second radially outer surface of the pipe;
    a pair of secondary insulation materials surrounding outer surfaces of the primary insulation materials;
    a pair of tertiary insulation materials surrounding outer surfaces of the secondary insulation materials;
    a pair of finishing covers surrounding outer surfaces of the tertiary insulation materials; and
    a low-density foam insulation material made of a foam material having a lower density than that of the secondary insulation materials, and covering each of lengthwise opposite ends of each of the secondary insulation materials and tertiary insulation materials,
    wherein the pair of secondary insulation materials are configured such that each of opposed contact surfaces thereof is formed in a shape bent at least one time;
    each of the primary insulation materials is produced to have a shorter length than that of each of the secondary insulation materials, so that lengthwise opposite ends of the primary insulation material are located at positions inward from those of the secondary insulation material; and
    a high-density foam insulation material is further provided, the high-density foam insulation material being in intimate contact with a lengthwise end of each of the primary insulation materials so as to cover a portion of the outer surfaces of the pipe that is not covered by the primary insulation material, and having a side protruding farther than an outer surface of the low-density foam insulation material.

2. The insulation device of claim 1, wherein the pair of secondary insulation materials are configured such that the opposed contact surfaces thereof have a protrusion and a recess engaged to each other.

3. The insulation device of claim 1, wherein the pair of secondary insulation materials are configured such that each of the opposed contact surfaces thereof has an inclined surface intersecting a radial direction of the pipe.

4. The insulation device of claim 1, further comprising:
    an out-profile coupled to each of the finishing covers so as to surround each of widthwise opposite ends of the finishing cover; and
    an in-profile coupled to each of the finishing covers so as to surround each of lengthwise opposite ends of the finishing cover.

5. The insulation device of claim 4, wherein when the pipe contracts in a lengthwise direction, the low-density foam insulation material expands in response thereto, and when the pipe expands in the lengthwise direction, the low-density foam insulation material contracts in response thereto.

6. The insulation device of claim 1, wherein when two neighboring primary insulation materials are arranged in an aligned relationship in a lengthwise direction, the high-density foam insulation material is press-fitted between the two neighboring primary insulation materials so as to fill a gap therebetween.

7. The insulation device of claim 1, further comprising:
    a semicircular connector ring into which two neighboring in-profiles in opposed contact with each other are inserted when two neighboring finishing covers are connected to each other in a lengthwise direction; and
    a connector clip connecting two connector rings arranged to form one circle.

* * * * *